May 20, 1924.
A. B. WALTERS
SODA FOUNTAIN
Original Filed June 11, 1920    10 Sheets-Sheet 1
1,495,049
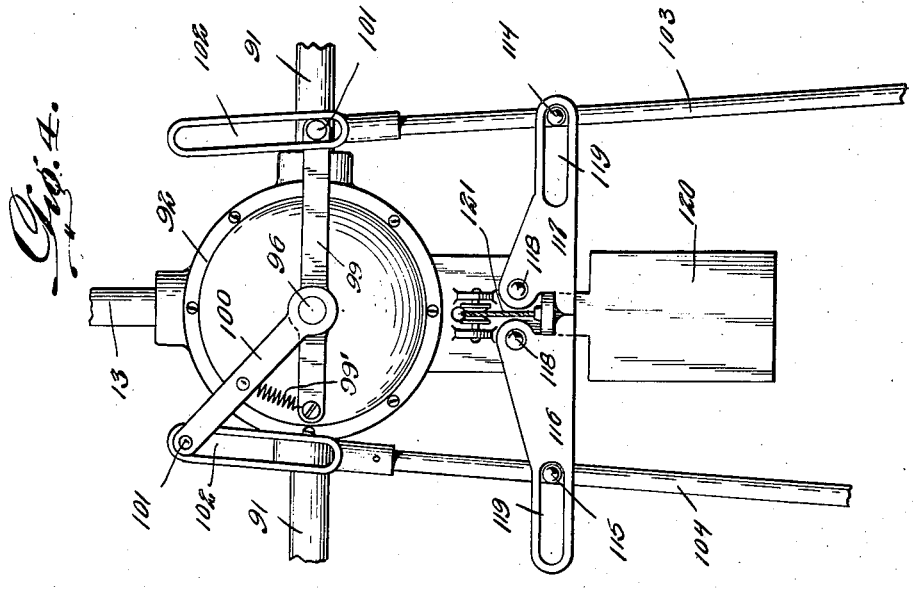
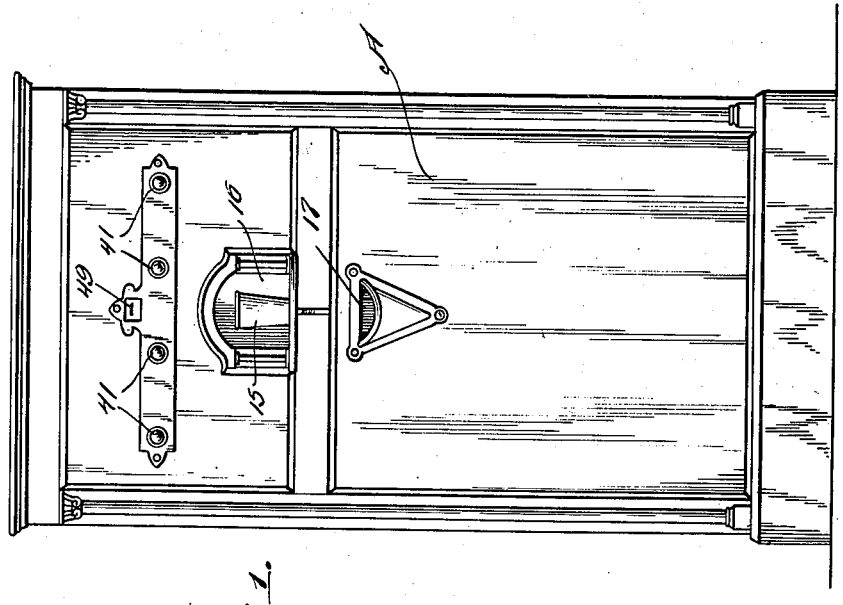

May 20, 1924.
A. B. WALTERS
SODA FOUNTAIN
Original Filed June 11, 1920    10 Sheets-Sheet 2
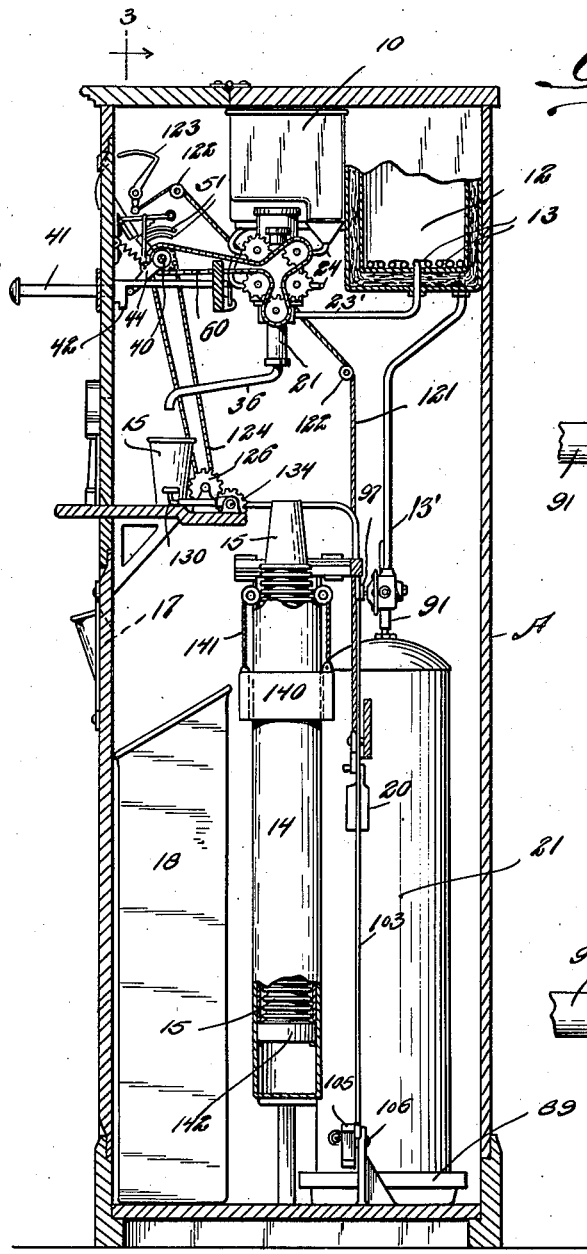
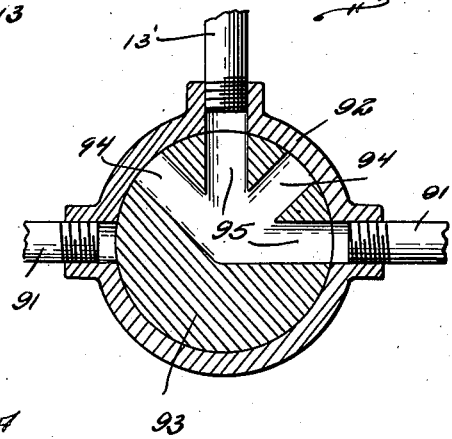
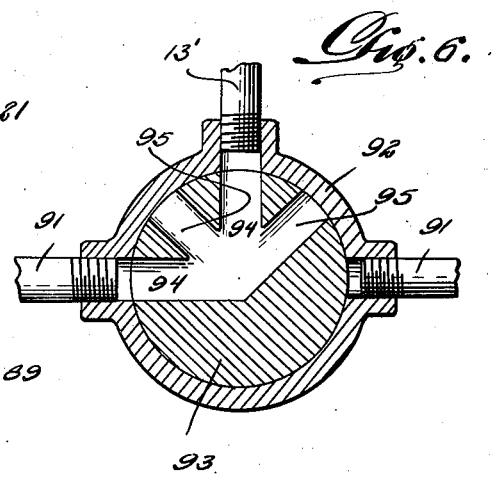
A. B. Walters.
INVENTOR
BY Victor J. Evans.
ATTORNEY May 20, 1924.
A. B. WALTERS
SODA FOUNTAIN
Original Filed June 11, 1920 10 Sheets-Sheet 3
1,495,049
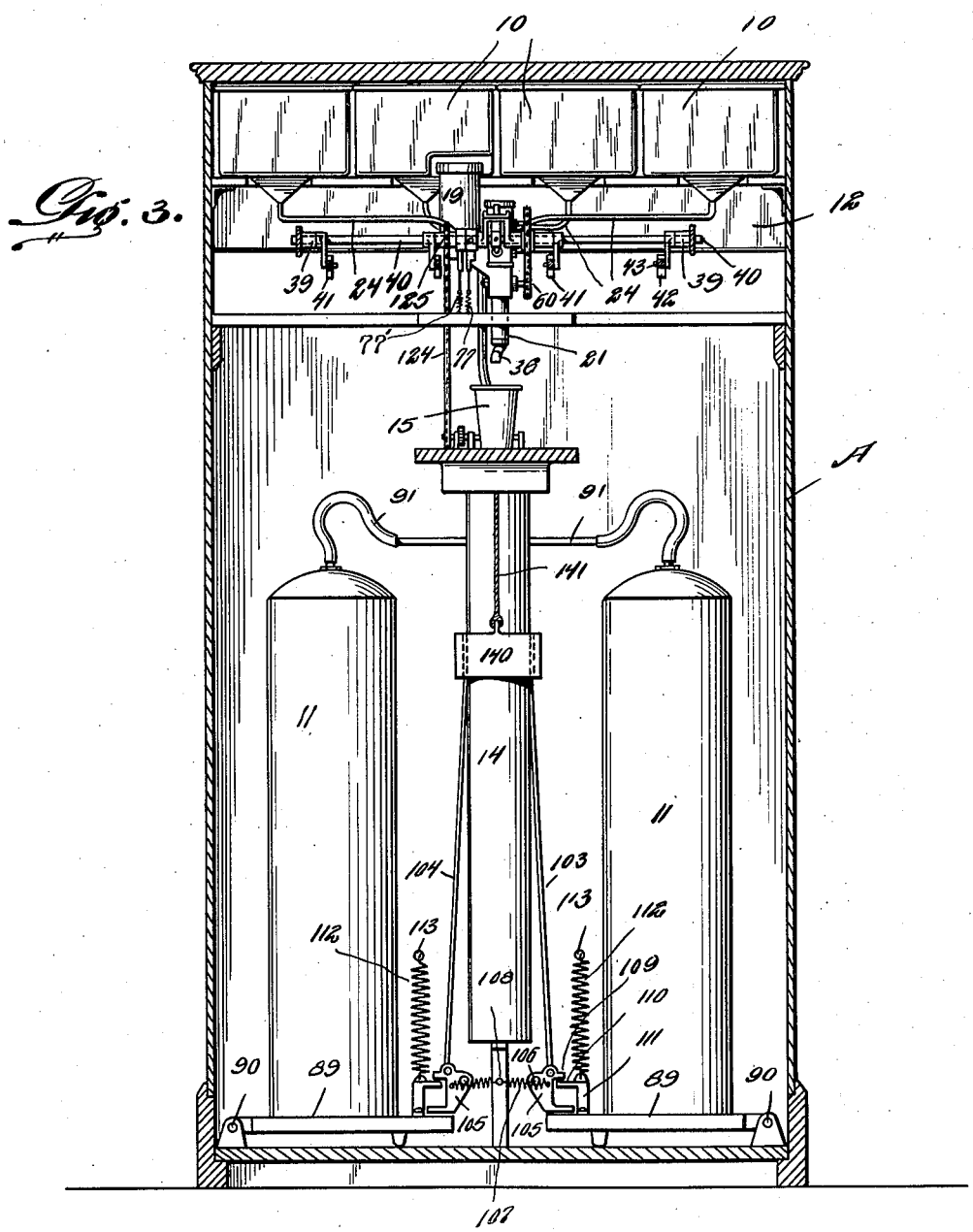

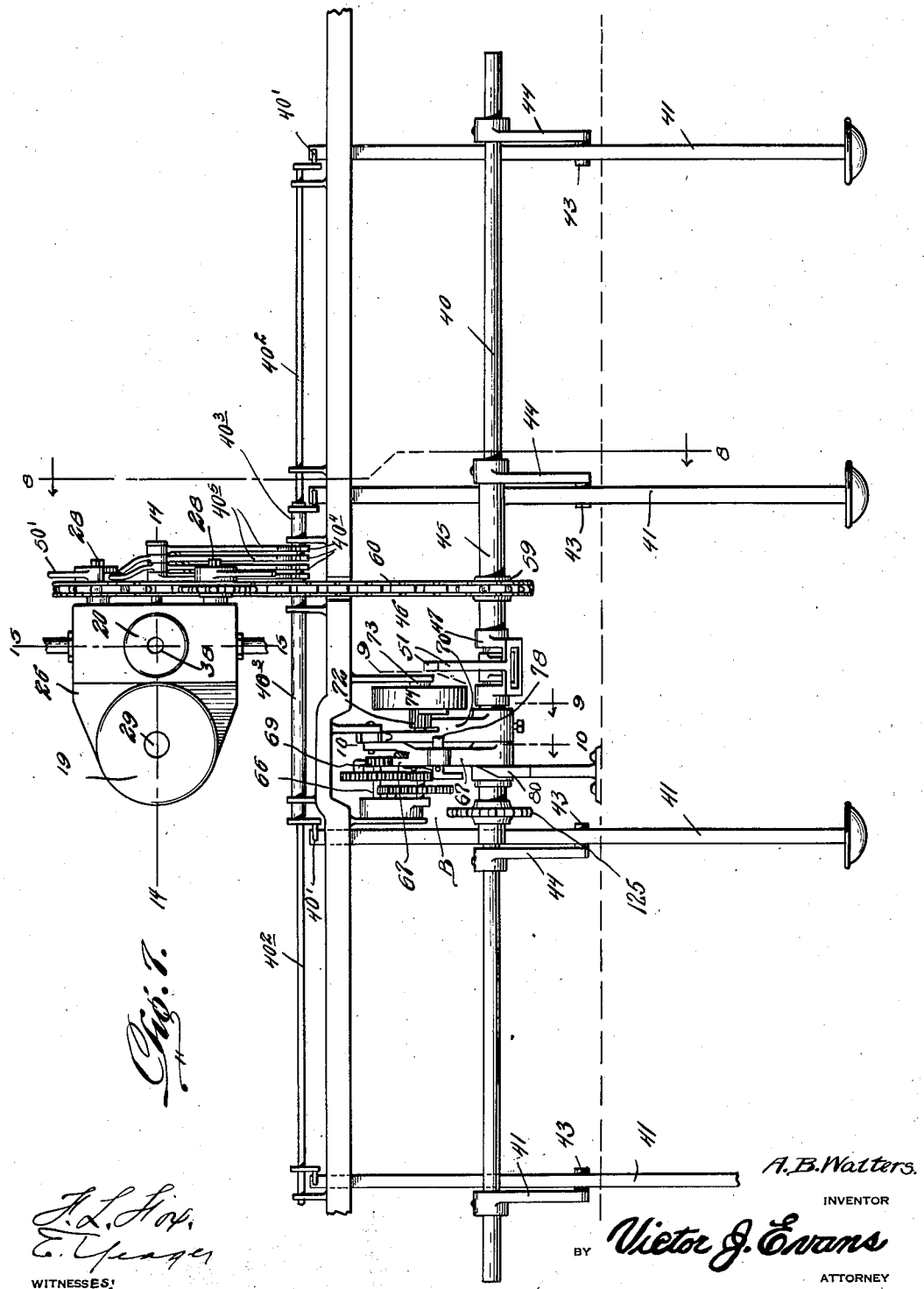

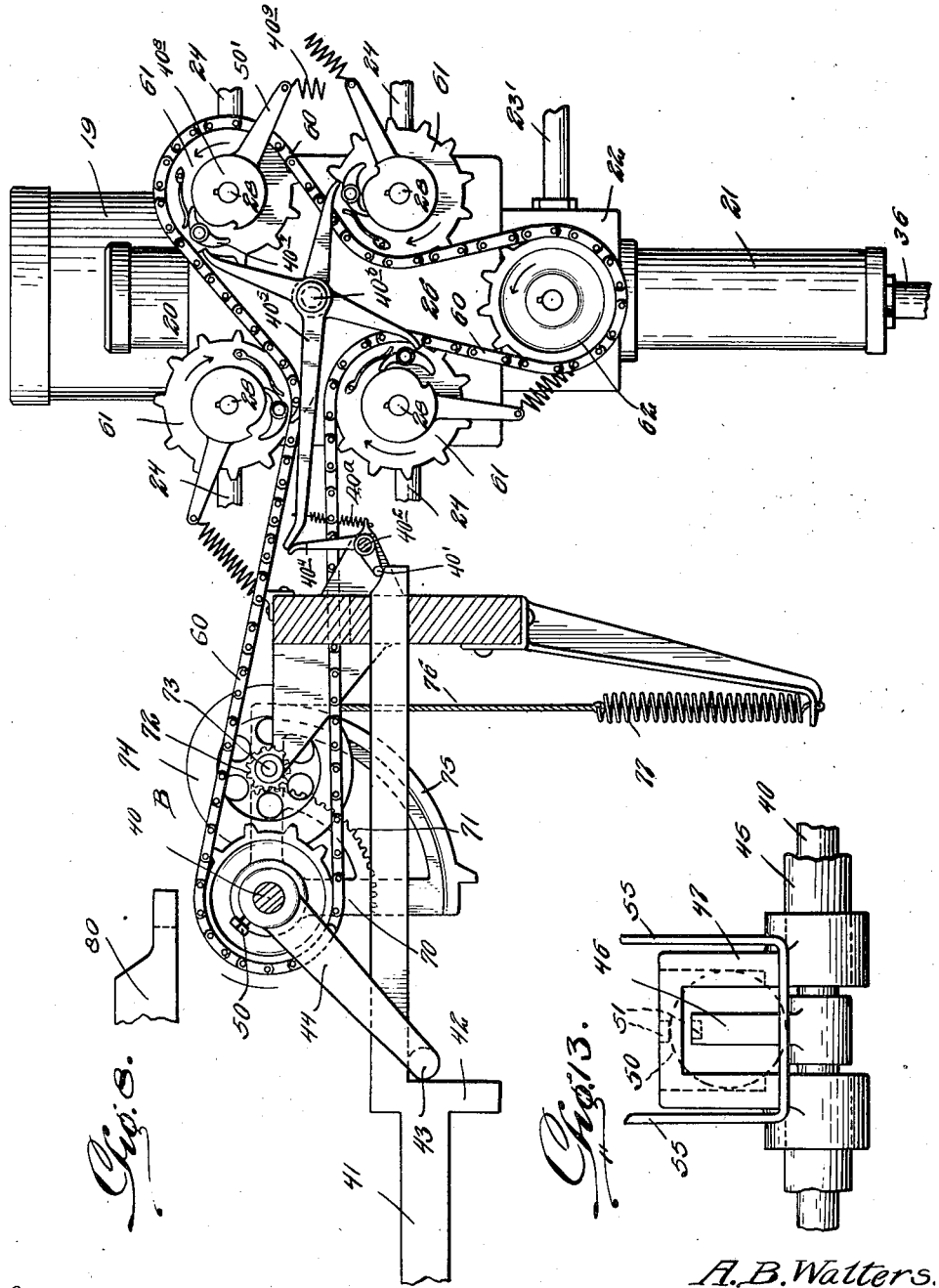

May 20, 1924.
A. B. WALTERS
SODA FOUNTAIN
Original Filed June 11, 1920 10 Sheets-Sheet 6
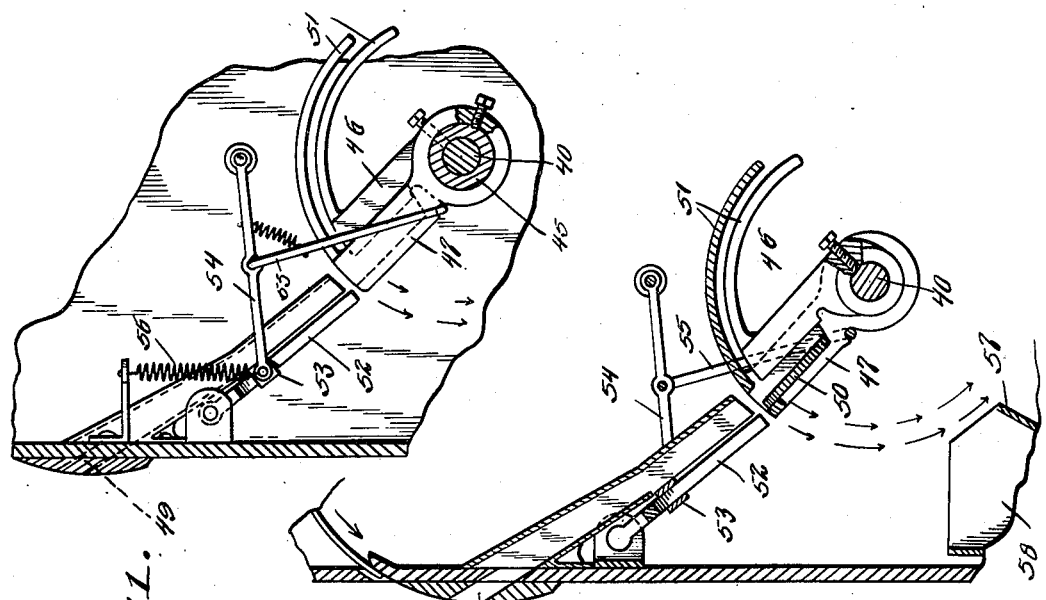
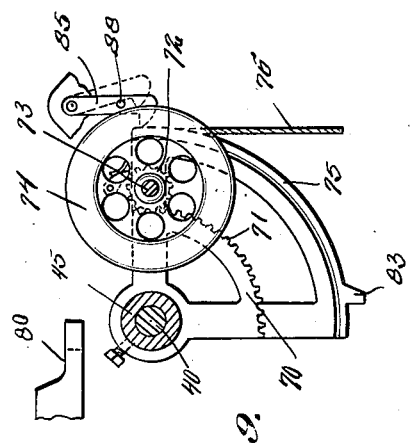
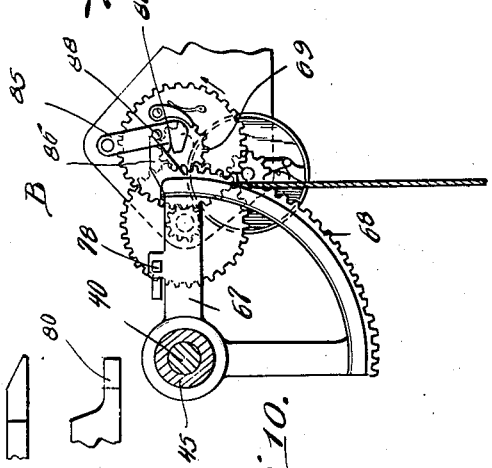

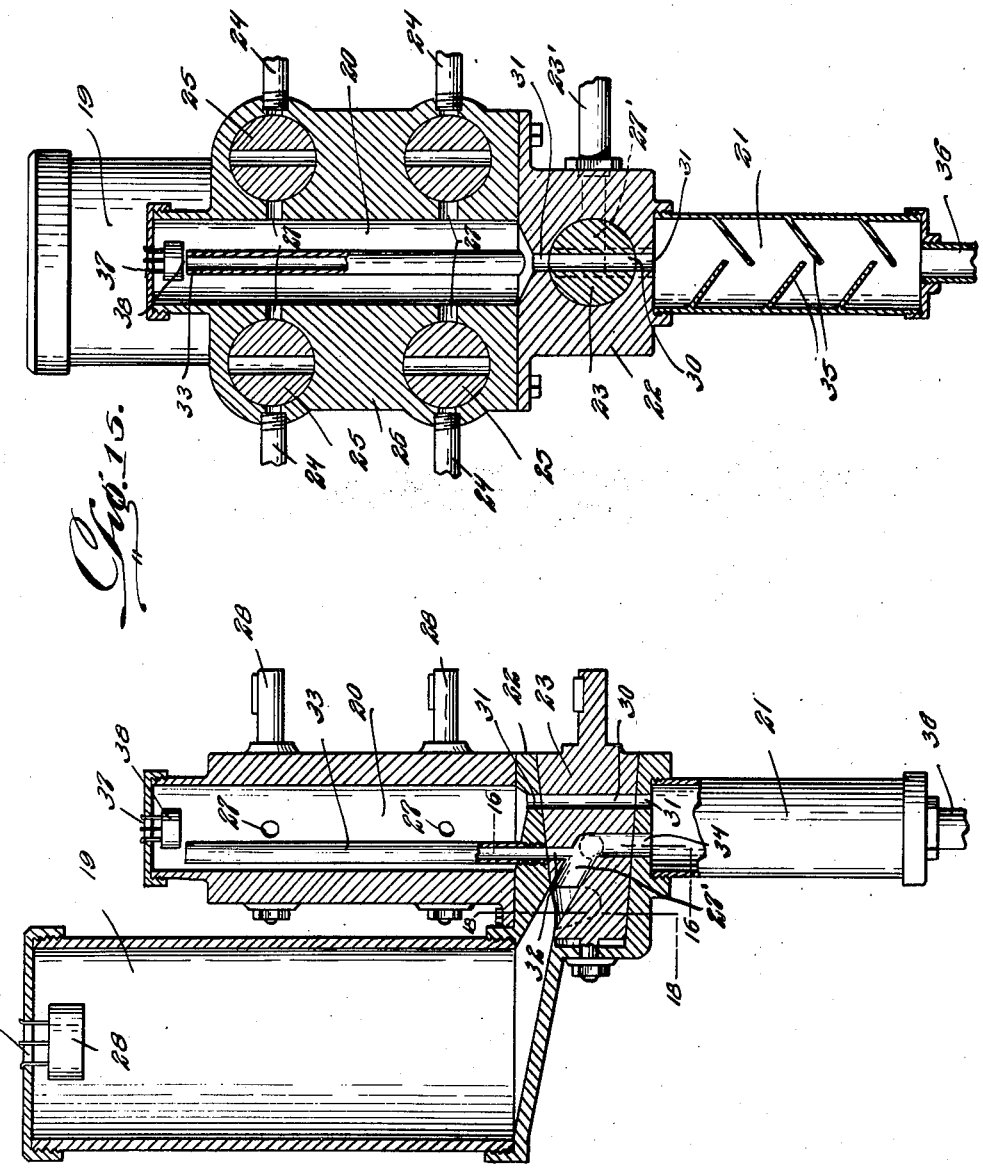

May 20, 1924.
A. B. WALTERS
SODA FOUNTAIN
Original Filed June 11, 1920     10 Sheets-Sheet 8
1,495,049
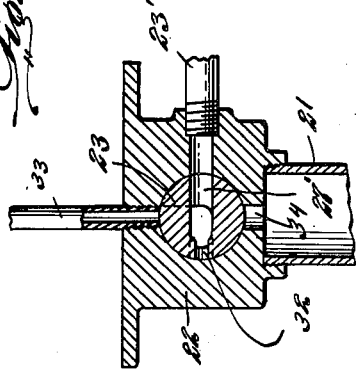
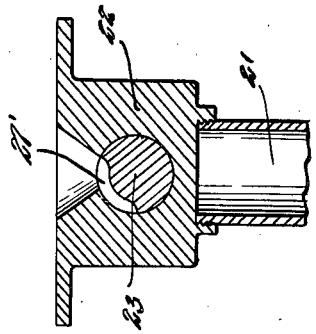
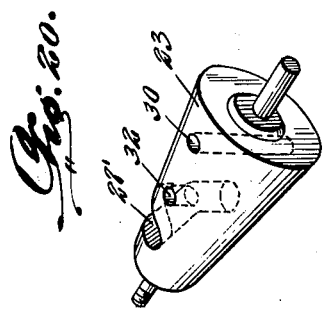
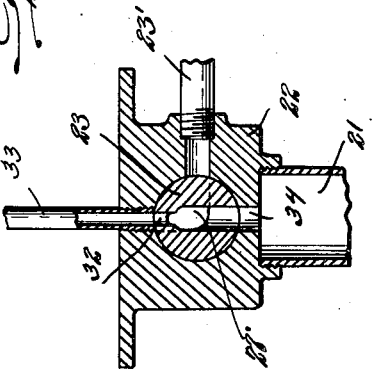
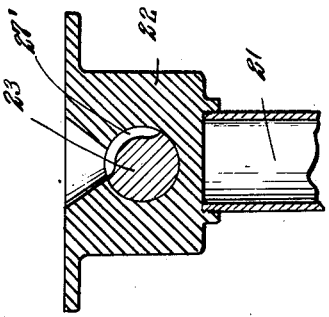
A. B. Walters,
INVENTOR
BY Victor J. Evans
ATTORNEY
WITNESSES:

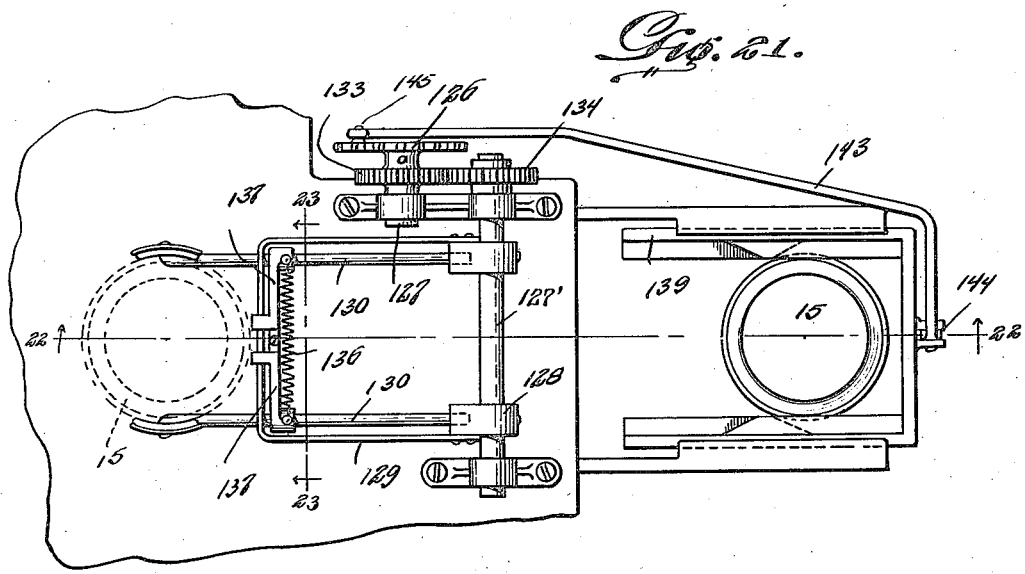
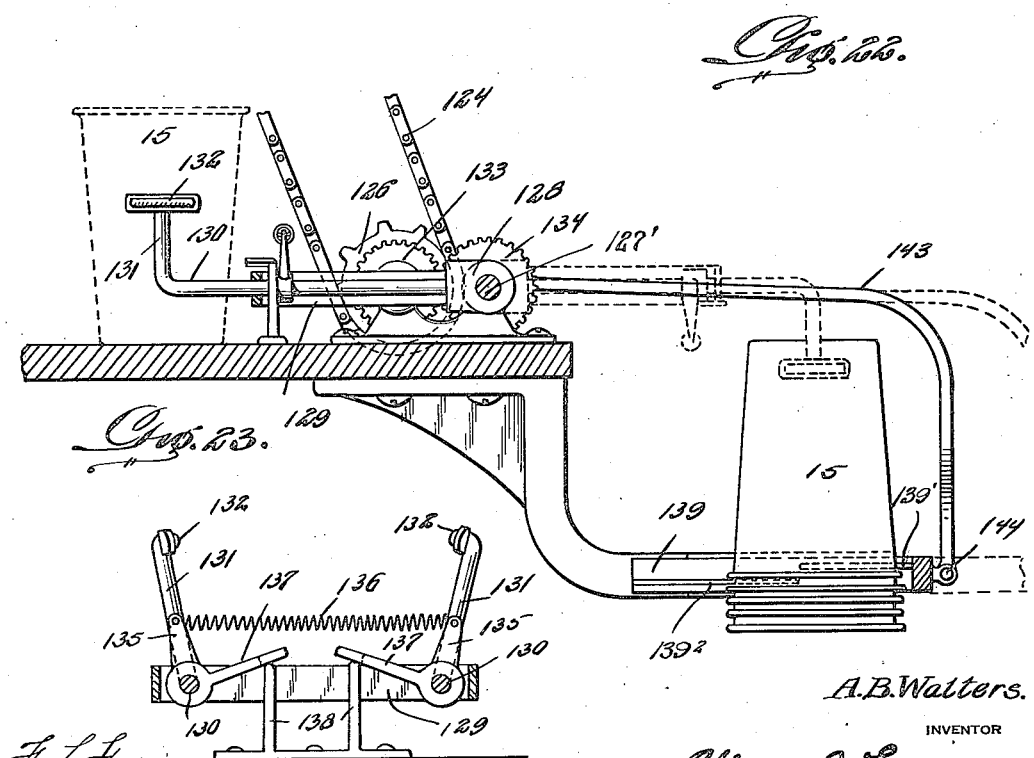

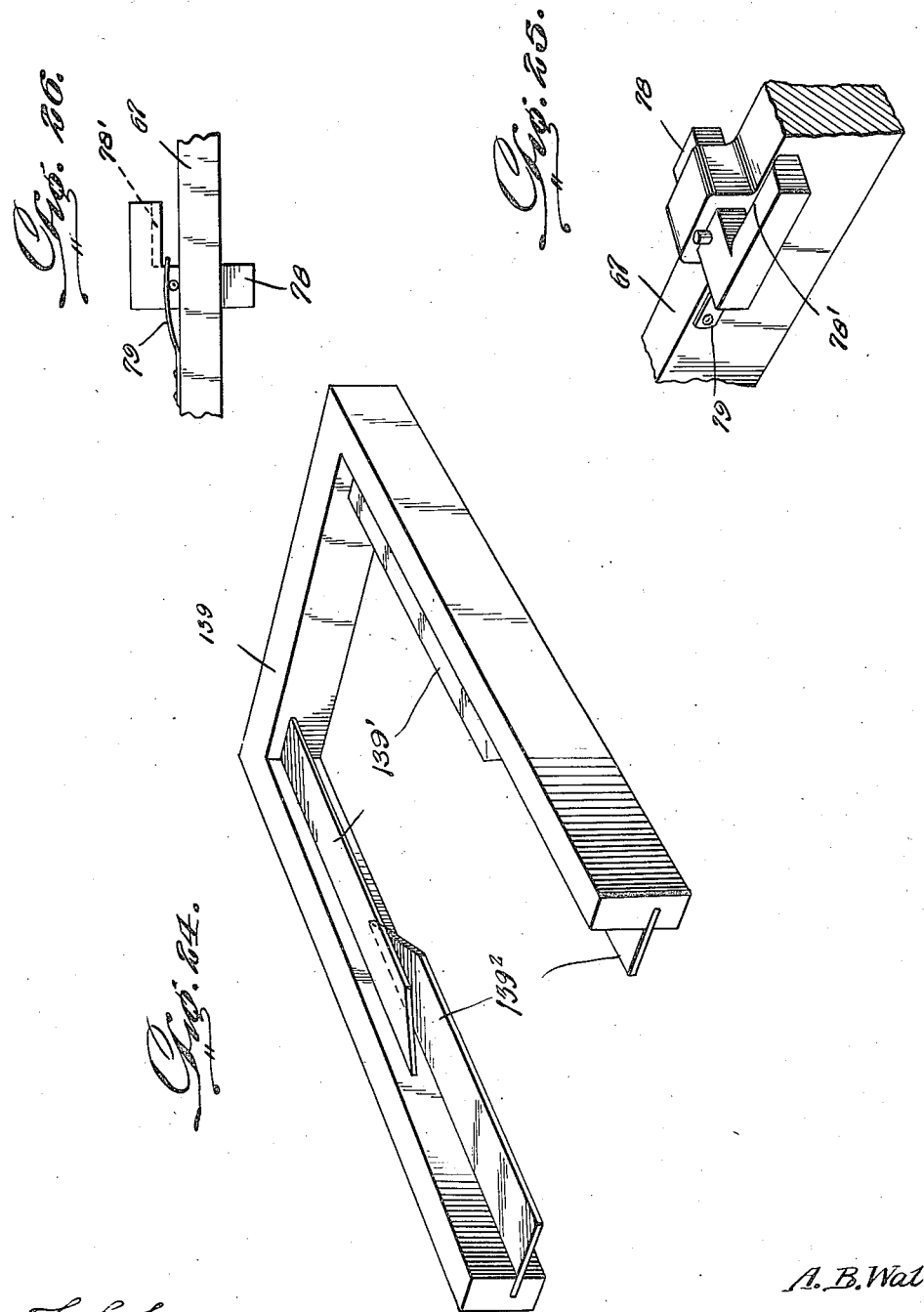

Patented May 20, 1924.

1,495,049

UNITED STATES PATENT OFFICE.

ARTHUR B. WALTERS, OF KANSAS CITY, MISSOURI, ASSIGNOR TO SODA SERVICE CORPORATION, OF KANSAS CITY, MISSOURI, A CORPORATION OF MISSOURI.

SODA FOUNTAIN.

Application filed June 11, 1920, Serial No. 388,271. Renewed October 15, 1923.

*To all whom it may concern:*

Be it known that I, ARTHUR B. WALTERS, a citizen of the United States, residing at Kansas City, in the county of Jackson and State of Missouri, have invented new and useful Improvements in Soda Fountains, of which the following is a specification.

This invention relates to soda fountains, and comprehends a construction including a coin operated mechanism for delivering a paper cup and filling the same with soda water or other liquid.

In carrying out the invention, I provide means for measuring a quantity of syrup of the selected flavor, and the quantity of carbonated water at each operation of the machine, so that these ingredients in proper proportions may be brought together and thoroughly mixed before entering the cup.

The invention makes use of a plurality of syrup containers, each of which has a valve controlled communication with the syrup measuring tank, with which the water measuring tank also communicates, means being provided to thoroughly rinse the syrup measuring tank upon each operation of the machine, with the carbonated water, with a view of preventing one syrup from affecting the taste of another.

Another object of importance, resides in the provision of means for cooling the carbonated water prior to its entrance into the measuring tank.

A still further object of the invention is the provision of means for timing the mechanism to allow the syrup and carbonated water to be properly measured and thoroughly mixed and the cup filled upon each operation of the machine, the motion being so controlled as to prevent the return of parts to normal position with any degree of abruptness.

It is also my purpose, to make use of a plurality of storage tanks of carbonated water, with means whereby, when one of the tanks becomes empty, the other tank is automatically put into operation, and in the event that both become empty to automatically render the machine inoperative.

The invention also provides means to prevent the machine from being operated by slugs, or coins other than those of the proper denomination.

The nature and advantages of the invention will be better understood when the following detail description is read in connection with the accompanying drawings, the invention residing in the construction, combination and arrangement of parts as claimed.

In the drawings forming part of this application, the like numerals of reference indicate similar parts in the several views, and wherein:

Figure 1 is a front elevation of the soda fountain.

Figure 2 is a vertical sectional view therethrough.

Figure 3 is a sectional view taken on line 3—3 of Figure 2.

Figure 4 is a fragmentary elevation of the water control valve.

Figure 5 is an enlarged vertical sectional view through the valved connection between said tanks, showing the valve in communication with one of the tanks.

Figure 6 is a similar view, showing the other active position of the valve.

Figure 7 is a top plan view of the valve operating mechanism.

Figure 8 is a sectional view taken on line 8—8 of Figure 7.

Figure 9 is a sectional view taken on line 9—9 of Figure 7.

Figure 10 is a sectional view taken on line 10—10 of Figure 7.

Figure 10$^a$ is a fragmentary plan view of the release for the sliding lug.

Figure 11 is a fragmentary elevation of a coin handling mechanism.

Figure 12 is a sectional view through Figure 11, showing the coin positioned in the machine.

Figure 13 is a view taken at right-angles to Figure 12, showing a part of the coin handling mechanism in elevation.

Figure 14 is a sectional view taken on line 14—14 of Figure 7.

Figure 15 is a sectional view taken on line 15—15 of Figure 7.

Figure 16 is a sectional view taken on line 16—16 of Figure 14.

Figure 17 is a similar view, showing the valve in a position to establish communication between the water tank and the measuring reservoir.

Figure 18 is a sectional view taken on line 18—18 of Figure 14.

Figure 19 is a similar view, showing the valve adjusted to the position illustrated in Figure 17.

Figure 20 is a perspective view of the valve.

Figure 21 is a fragmentary top plan view of the cup handling mechanism.

Figure 22 is a sectional view taken on line 22—22 of Figure 21.

Figure 23 is a sectional view taken on line 23—23 of Figure 21.

Figure 24 is a perspective view of the cup holding and releasing frame.

Figure 25 is a fragmentary perspective view of the sliding lug.

Figure 26 is an inverted plan view thereof.

Referring to the drawings in detail A indicates a cabinet or casing which is preferably of rectangular formation in cross section, and within which the mechanism forming the subject matter of my invention is arranged. At the top of the casing is a plurality of syrup containers or chambers 10, while arranged beneath the syrup chambers 10 are the storage tanks 11 for the carbonated water. Positioned adjacent the syrup chambers 10 is an ice box 12 in which is arranged the coils 13 of the supply pipe for conveying the carbonated water from one of the tanks 11, through the ice box and thence into the measuring and mixing apparatus to be hereinafter described. Also positioned within the casing A, is a tubular container 14 for a column of paper drinking cups 15. The front wall of the casing A is provided with an opening 16 through which the cups 15 are singly delivered and supported in a position to receive the soda or other liquid dispensed from the machine. The front wall of the casing is also provided with an opening 17 through which the used cups are passed, these cups being received by a waste receptacle 18 arranged within the casing. Both the delivery of the cup through the opening 16, and the dispensing of the fluid to fill the cup is controlled by coin actuated mechanism.

The combined measuring and mixing apparatus is as clearly illustrated in the drawings, arranged immediately beneath the syrup chambers 10 and the ice box 12. This apparatus includes a measuring receptacle 19 for the carbonated water, the measuring receptacle 20 for the syrup, and a mixing receptacle 21 wherein the proportionate amount of water and syrup is thoroughly mixed before the soda is dispensed into the cup. Projecting from the bottom of the measuring receptacle for the carbonated water, is a casting 22 which not only provides a valve casing for the rotary valve 23, but also constitutes a support for the measuring receptacle 20 and the mixing receptacle 21. The former is arranged at one side of the measuring receptacle 19 for the carbonated water, while the mixing chamber or receptacle 21 depends from the casting 22 in vertical alinement with the syrup measuring chamber 20. The syrup receptacle is common to all the syrup chambers 10, and leading from each of said chambers 10 is a supply pipe 24 to convey the syrup from said chamber to the measuring receptacle 20. The communication between the pipes 24 and the measuring receptacle 20 is controlled by the valves 25, the latter being rotatably fitted within the casting 26 and having a transverse bore 27 adapted to be brought into alinement with the inlet opening of the receptacle 20 in the open position of the valves. Obviously, there is one of these valves for each supply pipe 24. All of the valves including the valve 23 are provided with stems 28 arranged in parallelism. The valves 25 are selectively operated in a manner to be hereinafter described, to allow syrup of the desired flavor and from any one of the chambers 10 to enter the measuring receptacle 20. The coil 13 of the carbonated water supply pipe passes from the ice box 12 and is terminally connected with the casting 22 to supply the measuring receptacle 19 with water from the storage tanks 11. The communication between the tanks 11 and the measuring receptacle 19 is controlled by the valve 23. This terminal of the coil 13 is indicated at 23' and enters the casting 22 at one end thereof. The valve 23 has a bore 27' to establish communication between the terminal 23' of the water supply pipe, and the measuring receptacle 19 in one position of the valve, so as to allow a predetermined quantity of carbonated water to enter the measuring receptacle 19 before the valve 23 assumes the position illustrated in Figures 14, 15, 16, and 18. When the carbonated water enters the measuring receptacle 19, it actuates the float 28 and reaching a predetermined level, so that 28 covers the opening 29 in the top of the receptacle. This opening allows for the escape of air as will be readily appreciated. The valve 23 is provided with a bore 30 which when the valve is in the position illustrated in Figures 14, and 15, registers with the bores 31 of the casting 22, thus establishing communication between the syrup receptacle 20 and the mixing receptacle 21. The valve 23 is further provided with a bore 32 which when the valve is in the position shown in Figures 14, 15, 16 and 18, registers with an overflow pipe 33 for the carbonated water, this pipe being arranged within the syrup measuring receptacle 20. The bore 32 when so disposed also registers with a bore 34 in the casting 22, through the bore 27 thus establishing communication between the overflow pipe 33 and the mixing receptacle 21. In practice, the valves 23 and 25 are so timed, as to allow a predetermined quantity of syrup from one of the chambers 10 to enter the measuring receptacle 20, and a proportionate amount of carbonated water to enter the measuring receptacle 19 from one of the storage tanks 11. When the desired amount of these liquids have been received by their respective measuring receptacles, the valves 23 and 25 cut off the communication between the chamber 10 and the storage tank 11. Upon further operation of the machine, the valve 23 assumes the position illustrated in Figures 14, 15, 16 and 18, in which position communication is established between the carbonated water measuring receptacle 19 and the mixing chamber 21, and also between the syrup measuring receptacle 20 and the mixing chamber 21. As above stated, in this position of parts communication is also established between the overflow pipe 33 for the carbonated water, and the mixing chamber or receptacle 21. Consequently, the syrup contained within the receptacle 20 passes therefrom into the receptacle 21, while the carbonated water flows from the receptacle 19 into the mixing receptacle 21, both of these fluids being interrupted in their course of travel through the chamber 21 by means of the baffle plates 35 disposed in staggered relation as shown with their free ends terminating beyond the vertical axis of the receptacle 21. In this manner both the syrup and carbonated water are thoroughly mixed before leaving the mixing chamber 21. A discharge nozzle or the like 36 projects from the lower end of the mixing receptacle 21 and terminates at a point immediately above the opening 16 in the front wall of the casing A. This nozzle conveys the soda from the receptacle 21 to the cup 15 when the latter is presented in the opening 16. The syrup measuring chamber 20 is also provided with an opening 37 in the top thereof, which is closed by the float 38 when the syrup within the chamber 20 reaches a predetermined level. As the carbonated water flows from the receptacle 19 into the mixing receptacle 21, a certain quantity of this water flows up through the overflow pipe 33 into the syrup measuring receptacle 20, this overflow of carbonated water in the receptacle 20 serving to effectively rinse the syrup measuring receptacle, thus preventing one syrup from in any way affecting the taste of another admitted to the receptacle 20. This rinsing of the syrup measuring receptacle 20 takes place with each operation of the machine.

When any one of the push rods 41 is moved inwardly it contacts a lug or the like 40' projecting from each of the two rock shafts $40^2$ or the tubular rock members $40^3$ through which the shafts extend. There is one of these lugs 40' for each push rod 41 and for each lug there is an arm $40^4$. These arms actuate bell crank levers $40^5$, which are mounted on the shaft $40^6$.

There is one of the levers for each push rod 41 and each sprocket 61 as shown. Carried by each sprocket 61 is a spring pressed pawl $40^7$ which is moved by particular bell crank levers $40^5$ into engagement with the notched lock $40^8$ fixed on the shaft of the sprocket. Consequently the valves are selectively operated as follows.

By pushing one of the rods 41 inwardly the arm 44 is actuated to rotate the shaft 40 thereby moving the chain 60 and the sprockets 61 idly over the valve stems 28. The rod 41 so moved contacts one of the lugs $40^1$ which rocks one of the shafts $40^2$ or one of the tubular members $40^3$, depending of course upon the particular rod 41 operated. The associated arm $40^4$ of the said lug is also moved to actuate one of the bell crank levers $40^5$ which in turn locks a particular sprocket 61 on the stem of the valve by means of the pawl $40^7$. The sprocket 61 thus actuated is moved against the tension of a spring $40^9$ which has one end fixed and its opposite end secured to a finger 50' projecting from each of the notched disks $40^a$. A spring $40^a$ connects the bell crank lever $40^5$ to the lug having the arm $40^4$, the spring functioning to return the bell crank lever to normal position after it has been actuated to move the sprocket 61.

Arranged transversely within the casing A, and journaled in bearings 39, is the operating shaft 40 from which the valves 23 and 25 are actuated. The shaft 40 is rotated in one direction through the instrumentality of push rods 41, there being one of these rods for each syrup chamber 10 and the valve 25, the rods projecting from the front wall of the casing A, and slidable through bearings therein. Each rod has a shoulder 42 which is engaged by a pin 43 projecting at right angles from one end of each arm 44, the latter being fixed upon the shaft 40 so that when one of the push rods 41 is moved inwardly, rotation is imparted to the shaft 40 in one direction. A sleeve 45 of the desired length is loosely fitted on the shaft 40 and supports one member of the two cooperating coin handling members indicated at 46 and 47 respectively. The member 46 is in the form of a finger which is fitted to the shaft 40, and is of such size as to pass idly through the member 47 should one of the push rods 41 be actuated without first depositing a coin in the machine. For this purpose, the member 47 is of substantially inverted U-shape formation, the member 47 being fixed upon the sleeve 45. However, when a coin is deposited in the slot 49 in the front wall of the casing A, it is received within the channel portion of the member 47 and held in the position shown in Figures 12 and 13, wherein the coin is indicated at 50. When the coin is thus positioned, it is manifest that when the shaft 40 is rotated by pushing in on any one of the push rods 41, the finger or member 46 is brought into contact with the coin 50, the latter providing an operative connection between the shaft 40 and the sleeve 45 so that both of these parts are rotated in unison and in the same direction. Each of the members 46 and 47 respectively is provided with a coin rod 51, which supports the coin should the latter be deposited in the machine while either or both of the members 46 and 47 are in operation. Arranged within the casing A and immediately beneath the coin slot 49 is a pivoted magnet 52 upon which is slidably fitted a sleeve 53. The sleeve is pivotally associated with one end of a horizontally disposed lever 54, the latter being connected at a point between its ends with a vertically disposed lever 55 which is connected with the member 47. The magnet 52 prevents slugs or the like from passing into the member 47, and when the latter mentioned member is operated, the sleeve 53 is moved downwardly over the magnet 52 and thereby cleans the latter of any magnetic slugs or the like which may be clinging thereto. A spring 56 is secured to the casing A and to the adjacent end of the lever 54, the spring normally maintaining the sleeve 53 up on the arm and returning the sleeve to its normal position subsequent to operation. After the machine has been operated, the coins deposited into the member 47, gravitate into a chute 57 and directed thereby into a coin box 58.

Fixed upon the sleeve 45 is a sprocket 59 over which is trained an endless chain 60. As above stated, each valve 25 which controls communication between the respective syrup chambers 10, and the measuring receptacle 20, is provided with a stem, upon each of which is fixed a sprocket 61. The valve 23 which controls communication between the carbonated water tank 11 and the measuring receptacle 19 is also provided with a stem arranged in parallelism with the stems of the valves 25, and mounted upon this stem of the valve 23 is a sprocket 62. These sprockets 61, are loosely mounted upon their respective stems, while the endless chain 60 is trained in a manner to engage the teeth of all the sprockets. These sprockets are selectively operated in a manner to be presently described so that soda of the desired flavor can be obtained. When a coin of proper denomination is deposited in the coin slot 49, one of the push rods 41 is moved inwardly, the particular rod depending upon the desired flavor of the soda. When the rod 41 is pushed inwardly, the coin 50 which provides an operative connection between the shaft 40 and sleeve 45, causes both of these parts to rotate in unison. As the sleeve 45 rotates, the sprocket 59 is turned and puts the chain 60 into operation. This chain is trained over all the sprockets 61 and also over the sprocket 62. The latter mentioned sprocket is fixed to its valve stem and consequently turns the valve stem of the valve 23 to permit the proper amount of carbonated water to enter the receptacle 20. However, as above stated only one of the valves 25 is actuated at each operation of the machine and as the chain 60 continues in its movement, all of the sprockets 61 move idly over their valve stems, except the one sprocket which is operating the particular valve.

With a view of timing the operation of the machine so as to allow the receptacles 19 and 20 respectively to be properly filled with their liquid, I make use of a governor indicated generally at B in Figures 7, and 10, and including a main shaft 66 which is connected with and operated by a segmental arm 67 through a train of gearing as shown. This arm 67 is loosely mounted upon the sleeve 45 and is provided with teeth 68 which mesh with a pinion 69 mounted upon the shaft 66 of the governor. The pinion 69 is associated with the shaft 66 by a pawl and ratchet mechanism, so that when the shaft 40 is rotated by one of the push rods 41, and the arm 67 moved upwardly, the pinion 69 which meshes with the teeth of the arm 67 rotates idly upon the shaft 66 of the governor. However, when the arm 67 is being returned to normal position, it actuates the pinion 69 to rotate the shaft 66, thereby putting the governor B into operation so as to control or time the operation of the machine. The governor B operates to allow the arm 67 to return to normal position very slowly, as it is during the return movement of this arm 67 that the receptacles 19 and 20 respectively are being filled with the syrup and carbonated water. Fixed upon the sleeve 45 is a segmental arm 70 somewhat similar to the arm 67 with which it cooperates. The arm 70 is provided with teeth 71 which mesh with a gear 72 fixed upon the shaft 73 and upon which shaft is mounted a balance wheel 74. The arm 70 is provided with a groove 75 for the reception of a cable 76 which is secured to this arm at one end, the cable being connected to a spring 77 for a purpose to be presently described. This arm 70 also moves upwardly when the shaft 40 is rotated through the instrumentality of one of the push rods 41, this arm 70 being directly actuated by the shaft it being connected to the sleeve 45. The arm 70 engages the arm 67 to move the later simultaneously in an upward direction, it being hereinabove pointed out that the arm 67 is loosely mounted upon the sleeve 45. For this purpose the arm 70 is engaged by sliding a pin or lug 78 carried by the arm 67. The lug 78 is spring pressed, the spring being indicated at 79. When both the arms 67 and 70 approach the completion of their upward stroke, the offset beveled portion 78' of said lug contacts the stop 80 which moves the lug away from the arm 70, thus allowing the arm 67 to be returned to normal position by the spring 77' independently of the arm 70. During the return movement of the arm 67, the lug 78 is held in contact with the adjacent side of the arm 70 through the influence of the spring 79, and remains in contacting engagement with this side of the arm 70 until the latter is returned to normal position. When this arm 70 assumes its normal position, it moves out of engagement with the spring pressed lug 78, thereby allowing the latter to be projected in the path of movement of the arm 70 for the purpose above stated, namely, lifting of the arm 67 simultaneously with the raising of the arm 70. It is during this return movement of the arm 67, that the governor B is put into operation, thus allowing the arm 67 to move very slowly under the influence of the spring 77'. During the return movement of the arm 67, the receptacles 19 and 20 respectively are being filled with syrup and carbonated water. The arm 70 is provided with a terminal extension 83 which is adapted to be engaged by a pivoted latch 85. This latch holds the arm 70 in its raised position against the influence of the spring 77, while the arm 67 is being returned to normal position. However, as the arm 67 completes its return movement, the projection 86 formed on the arm 67 and having a cam like surface 87 is brought into contact with a pin 88 carried by the latch 85. This latch is thus moved about its pivot out of engagement with the terminal extension 83, thus releasing the arm 70. This arm when released moves to normal position under the influence of the spring 77, the teeth 71 of the arm rotating the gear 72 and the balance wheel 74, the latter controlling the movement of the arm to prevent its return to normal position too abruptly.

In Figures 3 and 4 I have clearly illustrated the mechanism which automatically puts one of the carbonated water storage tanks into operation when the other becomes empty. I have shown in these views each storage tank 11 supported upon a pivoted bottom 89, the bottom being pivoted as at 90. Positioned within each tank 11, is a branch 91 of the supply pipe for conveying the carbonated water from these tanks through the ice box 12 to the measuring receptacle 19. The branches 91 terminate adjacent the bottom of the respective tanks 11, and are connected in alternate communication with the main 13' through the instrumentality of a valve of the construction shown in Figures 5 and 6. This valve includes a casing 92 designed to accommodate a rotary valve 93. The casing 92 is provided at diametrically opposite points with threaded bores to receive the adjacent extremities of the branch pipes 91, the casing being also provided with a threaded bore at the top thereof to accommodate the adjacent end of the main pipe 13'. The valve 93 is provided with four radially disposed ports leading from the center of the valve to the periphery thereof, these ports working in pairs with one branch pipe 91 and the main supply pipe 13'. One pair of ports is indicated at 94, and the other indicated at 95. The valve is provided with a stem 96 which projects through a brace 97 secured to one side of the valve casing as shown.

Fixed upon the stem 96 is an arm 99, while loosely mounted upon the stem and projecting from the opposite side thereof and at an angle to the arm 99, is an arm 100. The arm 100 is connected at a point between its ends with the adjacent extremity of the arm 99 by a spring 99'. Carried by the outer end of each of said arms is a pin 101, each pin being positioned within a slot 102 formed in vertically movable rods with which each of said arms 99 and 100 respectively is associated. The vertically movable rod of the arm 99 is indicated at 103, while the corresponding rod for the arm 100 is indicated at 104. As shown in Figure 4, the pin 101 carried by the arm 99 is arranged to engage the lower end of the slot of its associated rod 103, while the pin carried by the arm 100 is arranged to engage the upper end of the slot in its arm 104. The corresponding lower extremities of these rods are connected as shown with the pivoted plates 105, each plate being pivoted at 106. Each plate at a point below the pivot thereof has terminally connected thereto a spring 107, these springs being horizontally disposed and having their adjacent extremities secured to a fixed point 108. Each plate is provided with an extension 109 which overlies the offset extremity 110 of a bolt 111, the headed end of which is secured to the pivoted bottom 89. Also secured to the offset extremity of each bolt 111 is one end of a contractile spring 112, this spring being vertically disposed and having its opposite end secured to a fixed plate 113. Carried by the rod 103 at an appropriate point in its length is a pin 114, the rod 104 having associated therewith a similar pin 115. A pair of identically formed plates 116 and 117 respectively are pivoted as at 118, and each of these plates is provided with an elongated slot 119 to receive the pins carried by the rods 103 and 104. The adjacent extremities of these plates are formed to engage and support in an elevated position, a weight 120, the latter being secured to one end of a flexible element 121. This element 121 is trained over pulleys 122 and has its opposite end secured to a pivoted closure 123 arranged within the casing A adjacent the coin slot 49.

In practice, the valve 93 is normally positioned in the manner illustrated in Figure 5, in one of the storage tanks 11 in communication with the main supply pipe 13′, for the purpose above stated. The pivoted bottom 89 for this tank is depressed under the weight of the tank, but as the tank empties the contractile spring 112 functions to lift the bottom 89, and the tank supported thereon. During this movement of parts, the adjacent plate 105 is swung upon its pivot in an upward direction, thus moving the rod 103 upwardly. As this rod moves upwardly, the arm 99 by reason of its association with the rod 103 is also moved upwardly, thus turning the valve 93 to a position where the ports 95 thereof establish communication between the other storage tank 11 and the main supply pipe 13′. Consequently, when the arm 99 is moved upon its pivot 96 as just stated, the spring 99′ is tensioned to automatically return the arm 99 to normal position when the rod 103 is locked incident to the levelling of the tank which controls the vertical movement of said rod 103. As the plate 105 is swung upwardly upon its pivot, its associated spring 107 is moved to a position beyond the center of the plate, and functions to hold the plate in its adjusted position until the tank is again filled. Now, when the other of the tanks 11 becomes empty, the tank is moved upwardly together with its pivoted bottom in the same manner. This moves the rod 104 upwardly. When the rod 103 is moved in an upward direction, the pivoted plate 117 is moved out of engagement with the weight 120, and the weight is still maintained in its elevated position through the instrumentality of the plate 116. But, as the rod 104 is moved in an upward direction in a manner thus stated, the plate 116 is also moved out of engagement from the weight 120, and the latter allowed to gravitate to its lowermost position. With the fall of the weight 120, the closure 123 is swung upon its pivot to project from within the casing A through the coin slot 49, thus preventing use of the machine until the tanks 11 have been refilled. Manifestly, the tanks 11 are automatically put into operation when one or the other becomes empty, and when both tanks have been emptied, the machine is automatically rendered inoperative.

The cup delivering mechanism is also actuated when one of the push rods 41 is actuated. This mechanism is operated by means of an endless chain 124 trained over a sprocket 125 fixed upon the sleeve 45, the chain being also trained over a sprocket 126 fixed upon the shaft 127. The shaft 127 is disposed beneath and in parallelism with the operating shaft 40. Fixed to the shaft 127′, are spaced castings 128 which support a substantially U-shaped frame 129. The castings 128 as well as the frame 129 form bearings for the cup delivery arms 130 which are mounted for partial rotation, each arm including a right angularly disposed portion 131 which is curved as shown and lined with rubber or other suitable material 132 so as to obtain a proper purchase upon the cup to be delivered. Fixed for rotation with the sprocket 126, is a gear 133, which meshes with a gear 134 secured to the shaft 127′. Consequently, the shaft 127′ is rotated simultaneously with and from the operating shaft 40, so as to move the frame 129 and the cup delivering arm 130 as a unit from the position illustrated in Figure 22 to a position to deliver the cup within the opening 16 in the casing A. Secured to each arm 130, is a bell crank lever, the corresponding branches 135 of which are connected by means of a coil spring 136. This spring normally maintains the right angularly disposed portions 131 of the delivery arms in gripping relation. However, when the frame 129 is swung in a proper direction to deliver a cup within an opening 16, the remaining corresponding branches 137 of the bell crank levers are brought into contact with the fixed element 138, thus causing the arms to rotate in a direction away from each other to effect a release of the cup. The movement of the arms in this direction is of course against the tension of the spring 136. Simultaneously operable with the frame 129, is a sliding frame 139, the latter being designed to embrace the rims of the cups 15, so as to allow but one cup at a time to be removed from the column positioned in the tubular container 14. These cups are fed upwardly to the top of the container by means of a weight 140 connected by the flexible elements 141 with a holder 142. A rod 143 is pivotally connected at its ends to frame 139 and sprocket 126, at 144 and 145, respectively, for reciprocating the frame. By reason of this construction, the frames 129 and 139 respectively are shifted in unison, so as to allow one cup to be delivered from the column of cups, the frame 139 maintaining the cups of the column in order. In other words, the sliding frame which is substantially U-shaped, is provided with flanges arranged in pairs and carried by the parallel portions of the frame as clearly illustrated in Figure 24. One pair of these flanges is indicated at 139′, and extends from the closed end of the frame toward the open end thereof, while the other pair of flanges indicated at 139² extend from the open end of the frame toward the closed end thereof but beneath the flanges 139'. The respective pairs of flanges are spaced, while the adjacent ends are overlapped, and beveled as illustrated. When the frame 139 is in the position illustrated in Figures 21 and 22, the flanges 139' are embracing the uppermost cup of the column of cups shown, while the flanges 139² are separated from the column. When the frame is shifted toward the right, the flanges 139' are moved out of engagement with the uppermost cup so that it can be removed from the column, during which time the flanges 139² engage the next cup on the column so that one cup can be delivered from the column with each operation. The flanges 139' and the flanges 139² alternately engage the cups in the column in successive order for this purpose.

Manifestly, I have devised an automatic soda fountain, wherein the different fluids utilized in the production of the soda, are dispensed in the proper proportions, thoroughly mixed, into a cup which is also delivered from within the machine to a point within convenient reach of the user. The mechanism for performing these functions is put into operation by actuating a single push rod subsequent to the depositing of a coin in the fountain.

While it is believed that from the foregoing description, the nature and advantages of the invention will be readily apparent, I desire to have it understood that I do not limit myself to the construction and arrangement of parts herein shown and described, and that such changes may be resorted to when desired as fall within the scope of what is claimed.

What I claim is:

1. A soda dispensing apparatus including a syrup container, a carbonated water container, a mixing chamber, measuring receptacles for respective containers, said receptacles communicating with the containers and said mixing chamber, coin controlled mechanism controlling said communication and including an operating shaft, a governor for timing said mechanism, and arms actuated by the shaft for operating said governor.

2. A soda dispensing apparatus including a syrup container, a carbonated water container, a mixing chamber, measuring receptacles for the respective containers, said receptacles communicating with the containers and said mixing chamber, coin controlled mechanism controlling the communication and including an operating shaft, a governor for timing said mechanism, a pair of arms actuated by the shaft and movable in unison in one direction, one of said arms operating the governor, means for returning said arms independently to normal position, and means actuated by one of said arms for controlling the movement of the other to a normal position.

3. A soda dispensing apparatus including a plurality of syrup containers, a carbonated water container, a mixing chamber, measuring receptacles for the respective containers, said receptacles communicating with the containers and said mixing chamber, valves controlling said communication, coin controlled mechanism for selectively operating said valves and including an operating shaft, a governor for timing the said mechanism, and means actuated by said shaft for operating said governor upon rotation of the shaft in one direction.

4. A soda dispensing apparatus including a syrup container, a carbonated water container, a mixing chamber, measuring receptacles for the respective containers, said receptacles communicating with the containers and with said mixing chamber, coin controlled mechanism controlling said communication and including an operating shaft, a cup container, cup delivery means operated from said shaft, a governor for timing said mechanism, and means actuated by the shaft for operating the governor upon rotation of the shaft in one direction.

5. A soda dispensing apparatus including a plurality of syrup containers, a carbonated water container, a mixing chamber, measuring receptacles for the respective containers, said receptacles communicating with the containers and said mixing chamber, valves controlling said communication, coin controlled mechanism for operating said valves, and including an operating shaft, a cup container, cup delivery means operated from said shaft, a governor for timing said mechanism, and means actuated by the shaft for operating the governor upon rotation of the shaft in one direction.

6. A soda dispensing apparatus including a syrup container, a plurality of carbonated water containers, a mixing chamber, coin controlled means controlling the communication between the mixing chamber and said containers, means whereby said water containers singly communicate with the mixing chamber, and automatically cutting off this communication when said tank empties, and establish communication between the other of said water tanks and said mixing chamber.

7. A soda dispensing apparatus including a syrup container, a plurality of carbonated water containers, a mixing chamber, measuring receptacles for the respective containers, said water containers singly communicating with their measuring receptacles, coin controlled means for controlling the communication between the containers and measuring receptacles, and between the latter and said mixing chamber, and means whereby one of said water containers is automatically put into use when the other of said containers empties.

8. A soda dispensing apparatus including a syrup container, a plurality of carbonated water containers, a mixing chamber, measuring receptacles for the respective containers, said water containers singly communicating with their measuring receptacles, coin controlled mechanism for controlling the communication between the containers and measuring receptacles, and between the latter and said mixing chamber, valves controlling the communication between the respective water containers and their measuring receptacles, and means for automatically operating this valve for cutting off the communication of one of said containers when it empties and establishing communication between the other of said containers and the measuring receptacles.

In testimony whereof I affix my signature.

ARTHUR B. WALTERS.